(12) United States Patent
Wang et al.

(10) Patent No.: US 8,518,548 B2
(45) Date of Patent: Aug. 27, 2013

(54) THERMOSENSITIVE LIGHT-ADJUSTING MATERIAL AND PROCESS THEREOF, AND AN OPTICAL DEVICE COMPRISING IT

(75) Inventors: Yuechuan Wang, Chengdu (CN); Gang Feng, Chengdu (CN)

(73) Assignee: Chengdu Bysun Hi-Tech Material Co., Ltd., Chengdu (CN)

( * ) Notice: Subject to any disclaimer, the term of this patent is extended or adjusted under 35 U.S.C. 154(b) by 576 days.

(21) Appl. No.: 12/676,477

(22) PCT Filed: Sep. 4, 2008

(86) PCT No.: PCT/CN2008/072271
§ 371 (c)(1),
(2), (4) Date: Mar. 4, 2010

(87) PCT Pub. No.: WO2009/033410
PCT Pub. Date: Mar. 19, 2009

(65) Prior Publication Data
US 2010/0209715 A1    Aug. 19, 2010

(30) Foreign Application Priority Data
Sep. 4, 2007  (CN) .......................... 2007 1 0049924

(51) Int. Cl.
*B32B 27/40* (2006.01)
*C08G 18/08* (2006.01)

(52) U.S. Cl.
USPC .............. 428/423.1; 428/425.6; 428/425.8; 264/331.15; 528/59

(58) Field of Classification Search
USPC .............. 428/425.6, 425.8, 423.1; 528/59; 264/331.15
See application file for complete search history.

(56) References Cited

U.S. PATENT DOCUMENTS

| | | | | |
|---|---|---|---|---|
| 5,278,199 A | * | 1/1994 | Ohkawa et al. | ............. 522/95 |
| 5,360,873 A | * | 11/1994 | Ohkawa et al. | ............. 525/193 |
| 6,362,303 B1 | | 3/2002 | Byker et al. | |
| 6,716,892 B1 | | 4/2004 | Mori et al. | |
| 7,232,850 B2 | * | 6/2007 | Johnson et al. | ............. 522/100 |

FOREIGN PATENT DOCUMENTS

| | | |
|---|---|---|
| CN | 1344286 A | 4/2002 |
| CN | 1390893 A | 1/2003 |
| EP | 0 539 030 A1 | 4/1993 |
| JP | 6-206956 A | 7/1994 |
| WO | 2006/120887 A1 | 11/2006 |

OTHER PUBLICATIONS

Supplementary European Search Report, dated Oct. 4, 2010, received in European Patent Application No. 08800783.6.

* cited by examiner

*Primary Examiner* — Thao T. Tran
(74) *Attorney, Agent, or Firm* — Sughrue Mion, PLLC

(57) ABSTRACT

A thermosensitive light-adjusting material is formed by reacting 18-84% polymer polyols and/or terminal hydroxyl-containing polymers which are formed by reacting polymer polyols and diisocyanate, with 15-80% terminal hydroxy-containing ethylenically unsaturated monomers through light or heat polymerization reaction. A process for preparing the thermosensitive light-adjusting material and an optical device comprising thereof. The light-adjusting ability is high, the light-adjusting range is broad, and mechanical capability is good. The preparation method is simple, short-circle, and high effective, so it can be applied in industry, furthermore, because of no organic solvents, the method's advantages are low cost and without pollution.

7 Claims, 1 Drawing Sheet

THERMOSENSITIVE LIGHT-ADJUSTING MATERIAL AND PROCESS THEREOF, AND AN OPTICAL DEVICE COMPRISING IT

CROSS-REFERENCE TO RELATED APPLICATION

This application claims priority to and the benefit of Chinese Patent Application No. 200710049924.0 filed in the Chinese Intellectual Property Office on Sep. 4, 2007, the entire contents of which are incorporated herein by reference.

TECHNICAL FIELD

The present invention relates to a field of a thermosensitive light-adjusting material, a preparing process thereof and an optical device, and particularly to a thermosensitive light-adjusting material, a preparing process thereof and an optical device comprising the same.

BACKGROUND ART

Different from a traditional solar shading fashion such as a curtain, a louver and the like, a thermal response smart window produced by a thermal response material can adjust an intensity of incident light and an irradiation heat immediately without using a mechanical force, which will facilitate human's living and working greatly.

A thermal response material can be classified into three types, such as thermally light scattering material (or thermotropics), a thermochromism material (or thermochromics), and a material with both of the above two properties. A thermal light scatting material is a kind of material which can vary an optical transmittance spontaneously along with the variety of temperature, such as transforming from a transparent state to a milkiness light scatting state (transparent-cloudy transformation). A thermochromism material is a kind of material which can vary the absorption characteristics of the visible band along with the variety of temperature, and a color variety can be identified visually. The third type of material which has both of the two properties is with the two kinds of functions simultaneously, i.e. both the transparent-cloudy transformation and the color variety occur along with the variety of temperature.

The light-adjusting principle of a thermally light scattering material is as follows, above the transformation temperature (i.e. cloud point), some micro-phases, micro-crystalline or micro-areas with unmatched refractive indexes caused by a phase separation and a aggregation structure transformation, allow for an incident light scatting inside the material, showing a cloudy state. After the temperature is reduced below the cloud point, these micro-phases, micro-crystalline or micro-areas disappear gradually, and the system goes back to a homogeneous phase, showing a transparent state again. In most of the applications, the thermally light scattering polymer system needs to satisfy the following requirements: the reversible transparent-cloudy transformation occurs; the transmittance at transparent state is or more than 75%, the transmittance at cloudy state is or less than 15%; the cloudy state of the system is homogeneous, which will not cause the eyes' discomfort; the material has predetermined mechanical and dynamical properties, and good stability; the material has higher cycle life on transparent-cloudy transformation.

The known the thermally light scattering polymeric materials are classified into following types:

1) The hydrogels with lowest critical solution temperature (LCST). The hydrogels occur the reversible phase separation with water above the LCST of the hydrogels so that the hydrogel system will exhibit the light scattering state because, and the hydrogels are placed into double-glass or polymeric films and then form a hydrogel-glass with a smart thermal response (See both A, Schneider J, Patzak A. Materials for intelligent sun protecting glazing. Sol Energy Mater Sol Cells, 2000, 60: 263; Nitz P, Hartwig H. Solar control with thermotropic layers. Solar Energy, 2005, 79: 573). In actual application, the thermal response smart hydrogel-glass device produced by the hydrogel is big in volume and thick because the water content of the hydrogel is very high (about 90%) and the device needs to be specifically sealed, it will restrict the use of the hydrogel-glass device. Furthermore, the mechanical property of the hydrogel is very poor, and then it is hard to be used as thin film material and it is easily to milden and rot.

2) The thermal light scatting polymeric thin film material disclosed in U.S. Pat. No. 5,916,972 (1999) is consist of the mixture of two or more two polymers. The extent of compatibility of the polymers correlates to temperature. When the temperature is below the lowest critical solution temperature (LCST), the polymeric components are compatible and they are sample phase, and then the material is transparent; when the temperature is above the lowest critical solution temperature (LCST), the polymeric components are not incompatible and they are separated phases, and then the material is opaque. Although such thermal light scatting polymeric film does not comprises water, the organic solvents such as benzenes, halogenated hydrocarbon, and the like, which are harmful for health, need to be used. In addition, these organic solvents can not be removed completely, and then they will remain in the finished polymeric film, and will influence the use thereof.

3) U.S. Pat. No. 5,977,201 (BASF Aktiengesellschaft) disclosed a crosslinked thermal light scatting polymeric thin film. The light-adjusting property is also obtained based on the characteristic of thermal phase separation of the blended polymers. Although the finished thin film does not contain any organic solvent with increased mechanical properties, it still has some disadvantages as follows: firstly, it is need to be specifically designed and carefully prepared the polymer with specific structure, including molecular weight and distribution thereof, and the like, to achieve and control the thermal phase separation; secondly, when preparing the material, two polymers are dissolved with an organic solvent, formulated into a solution, casted onto a substrate, and removed the solvent to form the thin film, and then the formed the thin film is crosslinked by UV lights. Therefore, such method is very complex with a long preparation cycle, and it needs to use volatile organic solvent, and then it increases the cost and is adverse to environmental protection.

SUMMARY OF THE INVENTION

The first object of the invention is to provide a new thermo-sensitive light-adjusting material, to solve the existing problems in the prior art.

The second object of the invention is to provide a new process for preparing the above mentioned thermo-sensitive light-adjusting material.

The further object of the invention is to provide an optical device comprising the thermo-sensitive light-adjusting material.

The new thermo-sensitive light-adjusting material provided to achieve the first object of the present invention, characterized in that, the thermo-sensitive light-adjusting material with the thickness of 0.6 mm has a optical transmittance of more than 70% when it is in transparent state, and has a transmittance of less than 10% when it is in cloudy state, and the transition temperature difference between the two states is more than 20° C.

The thermo-sensitive light-adjusting material is produced by photo- or thermo-polymerizing a polymer polyol and/or a hydroxyl-terminated polymer prepared by reacting a polymer polyol and diisocyanate in the amount of 18-84% by weight, and a hydroxyl-containing carbon-carbon unsaturated monomer in the amount of 15-80% by weight.

The process for preparing the new thermo-sensitive light-adjusting material provided to achieve the second object of the present invention, characterized in that, firstly mixing uniformly a polymer polyol and/or a hydroxyl-terminated polymer prepared by reacting a polymer polyol and diisocyanate in the amount of 18-84% by weight, and a hydroxyl-containing carbon-carbon unsaturated monomer in the amount of 15-80% by weight, and a photo-initiator in the amount of 0.3-7% by weight, and pouring the mixture into a mould or coating it onto a supporting substrate, irradiating it using a high pressure mercury lamp with a power of more than 80 w/cm for 10-120 sec, then a sheet or a film will be obtained. Alternatively, firstly mixing uniformly a polymer polyol and/or a hydroxyl-terminated polymer prepared by reacting a polymer polyol and diisocyanate in the amount of 18-84% by weight, a hydroxyl-containing carbon-carbon unsaturated monomer in the amount of 15-80% by weight, and a thermo-initiator in the amount of 0.1-2% by weight, and pouring the mixture into a mould or coating it onto a supporting substrate, heating until the temperature up to 50-130° C. and maintaining it for 6-10 h, and then a sheet or a film will be obtained.

The polymer polyols used in the process can be at least one of polyether polyols, aliphatic polyester polyols, and hydroxyl-terminated polymers prepared by reacting a polymer polyol and a diisocyanate, wherein the molecular weight of the polymer polyol is about 600-4000 g/mol, the molecular weight of the hydroxyl-terminated polymer is about 6000-20000 g/mol. The polyether polyols can be selected from a group consisting of polyethylene oxide polyols, polypropylene oxide polyols, poly-tetrahydrofuran polyols, polystyrene oxide polyols; and the aliphatic polyester polyols can be selected from a group consisting of polyester polyols prepared by reacting dicarboxylic acids and diols with 4-8 carbon atoms, and polyester polyols prepared by reacting a hydroxyl aliphatic acid with 4-8 carbon atoms. Diisocyanates can be aliphatic diisocyanates or aromatic diisocyanates, such as hexamethylene diisocyanate, isophorone diisocyanate, toluene diisocyanate, diphenylmethane diisocyanate, and the like. The reacting processes of the polyether polyols and the diisocyanates, please refer to Chen Yonglie, Zeng Zhaohua, Yang Jianwen et al., "Radiation Curing Materials and the Application thereof", Chemical Industry Press, pp 63-69, 2003.

The hydroxyl-containing carbon-carbon unsaturated monomers used in the process can be any of compounds with 6-30 carbon atoms, 2-6 oxygen atoms, and ester group, hydroxyl group, and aromatic ring, and the molecular weight of the monomer is 130-500 g/mol, the refractive index of the monomer is 1.48 or more. Such kind of monomer can be prepared by reacting a carboxy-containing styrene and ethylene oxide, propylene oxide, styrene oxide and the like. Alternatively, it can be prepared by reacting (methyl)acrylic acid and an epoxy compound. The processes for the preparation please refer to Wang Dezhong, "The Manufacture for Epoxy Resins and the Applications thereof", Chemical Industry Press, 2001.

The photo-initiators used in the process are free radical type initiators, in particular, they can be selected from any of 2-hydroxyl-2-methyl-1-phenyl-1-acetone, 1-hydroxyl cyclohexyl phenyl ketone, diphenyl ketone, 2,4,6-trimethyl benzoyl-diphenyl phosphine oxide, bis(2,4,6-trimethyl benzoyl)-phenyl phosphine oxide, bis(2,4,6-trimethyl benzoyl)-(4,4-dimethyl octyl-2) phosphine oxide; and the thermo-initiators used in the process are also free radical type initiators, in particular, they can be selected from any of benzoyl peroxide, cyclohexanone peroxide, dodecanoyl peroxide, azo-bis-iso-butyronitrile or azo-bis-iso-heptonitrile.

The thickness of the sheet or film of the invention can be designed to be 0.1 mm-3 mm dependent to the use thereof. Generally, the optical transmittances of transparent state and cloudy state can be decreased when the thickness is big, particularly the transmittance of a cloudy state can be very small; when the thickness is very small, the optical transmittance of a cloudy state under high temperature is also bigger, even though the optical transmittance of a transparent state is big, so the difference of the transmittances will be decreased.

In order to improve the weathering resistance and appearance of the material, a light stabilizer, and a thermo-stabilizer with the properties of light resistance, oxidation-resistance, aging-resistance, and the like additives, and a pigment, a filling and the like can be added into the polymerized mixture, additionally, a leveling agent, a antifoaming agent and the like with the property of adjusting a processability can be added into the polymerized mixture. The addition of these additives and fillings and the like is a common knowledge in the art.

Another aspect of the invention provides an optical device, comprising the thermosensitive light-adjusting material prepared by the above mentioned process. In one embodiment, the device comprises a substrate, a covering layer, and a sheet or a film placed between the above two produced by a thermosensitive light-adjusting material. In another embodiment, the device comprises a substrate, and a thermosensitive light-adjusting material film coated onto it.

The substrate used in the invention includes, but not is limited to, plastic film, plastic plate, fiber glass sheet, steel belt, metal plate, flat glass, organic glass, conductive glass, and the like; the covering layer can be a transparent coating, a plastic film or sheet.

Comparing to the prior art, the invention has the following advantages:

1. Because water is not comprised in the thermosensitive light-adjusting material prepared in the invention, problems due to a large amount of water in the thermal response smart gel glass produced by hydrogels (or aqueous gels) can be avoided.

2. Because organic solvents are not involved in the preparing process of the invention, the thermosensitive light-adjusting materials produced through such process do not contain organic solvents. Therefore, environmental pollutants and/or hazards to the human beings, brought about by the volatilization of the organic solvents, can be avoided. In addition, the manufacturing cost can be greatly reduced because of the absence of required treatments to environmental pollution, and/or hazards to the human beings.

3. The thermosensitive light-adjusting material demonstrates a repeatable thermo-optic inter-phase swing due to the following characteristics. That is, the compatibility between the subsdances in the thermosensitive light-adjusting material changes along with change of temperature. At ambient temperature, the hydroxyl-containing carbon-carbon unsaturated monomer contained is well compatible with a polyether polyol and/or the hydroxyl-terminated polymer prepared by reacting a polyether polyol and diisocyanate, thus, the transparent state is demonstrated. However, at a higher temperature, a phase separation occurs between the hydroxyl-containing carbon-carbon unsaturated monomer, the polyether polyol and/or the hydroxyl-terminated polymer prepared by reacting a polyether polyol and diisocyanate. And, because the hydroxyl-containing carbon-carbon unsaturated monomer contained is not dissolved in the polyether polyol and/or the hydroxyl-terminated polymer prepared by reacting a polyether polyol and diisocyanate, it will becomes transparent again when temperature goes down. Therefore, the thermosensitive light-adjusting material has a strong light adjusting property, and can adjust a large range of light, and also has a good mechanical property.

4. In the invention, the optical thermosensitive material is prepared by firstly preparing a polymerizable mixture solution comprising a polyether polyol and/or the hydroxyl-terminated polymer prepared by reacting a polyether polyol and diisocyanate, initiator, and a hydroxyl-containing carbon-carbon unsaturated monomer, and then after coating the solution onto a substrate or casting (pouring) it into a mould, then using a photo-curing or thermo-curing process. Therefore, the preparing process is simple, the period of a cycle is short, and the efficiency is high, and then it can be carried out in an industrial scale.

DESCRIPTION OF PREFERRED EMBODIMENTS

Figure 1:
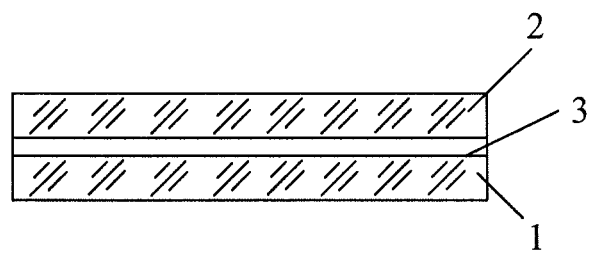
FIG. 1 is a cross-section schematic view showing the configuration of an optical device.

The present invention will be specifically described in detail below with reference to the following Examples. However, it should not be deemed as the limitation for the invention, the following examples are intended to further illustrate the present invention. The various changes and modifications may be made by those of ordinary skill in the art without departing from the spirit and scope of the invention will fall within the scopes of the claims.

The symbols used in the examples will be explained below:

PUA 1=a polyether polyurethane, prepared by toluene diisocyanate, and polyethylene oxide (molecular weight of 800 g/mol), with the molecular weight of 9000 g/mol;

PUA 2=a polyether polyurethane, prepared by toluene diisocyanate, polyethylene oxide (molecular weight of 800 g/mol), with the molecular weight of 7000 g/mol.

TDiol 1000 and TDiol 2000 are polyether glycols copolymerized by ethylene oxide and propylene oxide, with the molecular weights of 1000 g/mol and 2000 g/mol, respectively, produced by Second Petrochemical Industry of Tianjin;

1173=2-hydroxy-2-methyl-1-phenyl-1-acetone, a photo-initiator, produced by Ciba;

TPO=2,4,6-trimethylbenzoyl-diphenylphosphine oxide, a photo-initiator, produced by Ciba.

In addition, Ultraviolet-Visible Spectrophotometer is used to measure the transmittance of the materials obtained in the examples during measuring optical properties.

Example 1

The present example prepared a hydroxyl-containing carbon-carbon unsaturated monomer.

Naphthoic acid (172 g), glycidyl methacrylate (145 g), tetrabutyl ammonium bromide (4 g), and hydroquinone (0.15 g) were stirred at a temperature of 80-100° C. until an acid value became a constant value, and the reaction was quenched, and then a Monomer 1 was obtained. The molecule of Monomer 1 contains 18 carbon atoms and 5 oxygen atoms, with the refractive index of 1.56.

Example 2

The present example prepared a hydroxyl-containing carbon-carbon unsaturated monomer.

Benzoic acid (122 g), glycidyl acrylate (145 g), tetrabutyl ammonium bromide (4 g), and hydroquinone (0.15 g) were stirred at a temperature of 80-100° C. until an acid value became a constant value, and the reaction was quenched, and then a Monomer 2 was obtained. The molecule of Monomer 2 contains 13 carbon atoms and 5 oxygen atoms, with the refractive index of 1.52.

Example 3

The present example prepared a hydroxyl-containing carbon-carbon unsaturated monomer.

Vinyl benzoic acid (148 g), epichlorohydrin (92 g), tetrabutyl ammonium bromide (4 g), and hydroquinone (0.15 g) were stirred at a temperature of 80-100° C. until an acid value became a constant value, and the reaction was quenched, and then Monomer 3 was obtained. The molecule of Monomer 3 contains 12 carbon atoms and 3 oxygen atoms, with the refractive index of 1.52.

Example 4

The present example prepared a thermosensitive light-adjusting film by photo-curing.

Monomer 2 (65 g), TDiol 2000 polyether (16 g), and photo-initiator 1173 (3 g) were mixed uniformly at room temperature, and then the mixture was poured into a stainless steel mould of 20 mm length, 20 mm width, and 0.6 mm depth which had been treated with a silane releasing agent, the mixture was levelled, and then the surface was covered with a transparent polyester film when there was no air bubble, and finally, it was irradiated using a high pressure mercury lamp with a power of 120 w/cm for 15-30 sec, and then Sample A was obtained by taking out the film. At a temperature from room temperature to about 80° C., Sample A has a colorless and transparent appearance, and has an optical transmittance of more than 80%; and at 110° C., the appearance becomes white, and the optical transmittance is less than 5%. The thermo-optic effect shown by Sample A can be repeated.

Example 5

The present example prepared a thermosensitive light-adjusting film by photo-curing.

Monomer 1 (16 g), TDiol 2000 (5 g), TDiol 1000 (60 g), and photo-initiator 1173 (5 g) were mixed uniformly at room temperature, and then the mixture was poured into a stainless steel mould of 20 mm length, 20 mm width, and 0.6 mm depth which had been treated with a silane releasing agent, the mixture was levelled, and then the surface was covered with a transparent polyester film when there was no air bubble, and finally, it was irradiated using a high pressure mercury lamp with a power of 120 w/cm for 15-30 sec, and then Sample B was obtained by taking out the film. At a temperature from room temperature to about 40° C., Sample B has a colorless and transparent appearance, and has an optical transmittance of more than 75%; and at 60° C., the appearance becomes white, and the optical transmittance is less than 10%. The thermo-optic effect shown by Sample B can be repeated.

Example 6

The present example prepared a thermosensitive light-adjusting film by photo-curing.

Monomer 1 (20 g), Monomer 2 (10 g), TDiol 1000 (30 g), PUA 1 (30 g), and photo-initiator 1173 (5 g) were mixed uniformly at room temperature, and then the mixture was poured into a stainless steel mould of 20 mm length, 20 mm width, and 0.6 mm depth which had been treated with a silane releasing agent, and the mixture was levelled, and then the surface was covered with a transparent polyester film when there was no air bubble, and finally, it was irradiated using a high pressure mercury lamp with a power of 120 w/cm for 15-30 sec, and then Sample C was obtained by taking out the film. At a temperature from room temperature to about 45° C., Sample C has a colorless and transparent appearance, and has an optical transmittance of more than 70%; and at 70° C., the appearance becomes white, and the optical transmittance is less than 10%. The thermo-optic effect shown by Sample C can be repeated.

Example 7

The present example prepared a thermosensitive electro-light-adjusting film by photo-curing.

At room temperature, Monomer 1 (30 g), Monomer 2 (10 g), TDiol 1000 (30 g), poly-caprolactone polyol (10 g, molecular weight of 1000 g/mol), and photo-initiator TPO (1.6 g) were mixed uniformly, and then the mixture was poured into a glass mould of 100 mm length, 50 mm width, and 0.3 mm depth. The upper surface and the lower surface of the mould are conductive glass, one opposite edge of each surface of the conductive glass was connected to a 0-36V variable direct current power, the surface resistivity of the conductive glass is ~50(Ω/□ or Ω), and after electrifying, the surface temperature of the glass can rise to 60-80° C. The mould was irradiated using a high pressure mercury lamp with a power of 60-80 w/cm for 1-2 min, and then the mixture mixed uniformly and without air bubble became transparent and cured in the mould, and then the mixture formed a desired device together with the electric heated glass. FIG. 1 shows the cross-section structure of the obtained device, in which 1 represents a conductive glass as a substrate, 2 represents a conductive glass as covering layer, 3 represents an optical film material prepared in the present example. The optical film material in the device is transparent at a temperature from room temperature to about 50° C., and has an optical transmittance of more than 70%, after heating to 70° C. by electrifying, the device becomes cloudy, the transmittance is decreased to 5%, and the thermo-optic effect shown by the optical film material 3 on the device can be repeated.

Example 8

The present example prepared a thermosensitive light-adjusting film by photo-curing.

Monomer 1 (20 g), Monomer 3 (5 g), TDiol 1000 (40 g), and azo-bis-iso-heptonitrile (0.2 g) were mixed uniformly at room temperature, and then the mixture was poured into a stainless steel mould of 20 mm length, 20 mm width, and 0.6 mm depth which had been treated with a silane releasing agent, the mould was treated with a silane releasing agent first, and the mixture was levelled, and then the surface was covered with an aluminium plate when there was no air bubble, and finally, it was put into an oven, under 60-70° C. for 10 h, and then Sample E was obtained by taking out the film. At a temperature from room temperature to about 60° C., Sample E has a colorless and transparent appearance, and has an optical transmittance of more than 75%; and at 90° C., the appearance becomes white, and the optical transmittance is less than 10%. The thermo-optic effect shown by Sample E can be repeated.

Example 9

The present example prepared a thermosensitive light-adjusting film by photo-curing.

Monomer 1 (30 g), TDiol 1000 (35 g), and benzoyl peroxide (0.6 g) were mixed uniformly at room temperature, and then the mixture was poured into a stainless steel mould of 20 mm length, 20 mm width, and 0.6 mm depth which had been treated with a silane releasing agent, the mould was treated with a silane releasing agent first, and the mixture was levelled, the surface was covered with an aluminium plate when there was no air bubble, and finally, it was put into an oven, under 80-100° C. for 8 h, and then Sample F was obtained by taking the film out. At a temperature from room temperature to about 60° C., Sample F has a colorless and transparent appearance, and has an optical transmittance of more than 75%; and at 90° C., the appearance becomes white, and the optical transmittance is less than 10%. The thermo-optic effect shown by Sample F can be repeated.

Example 10

The present example prepared a thermosensitive light-adjusting film by photo-curing.

Monomer 1 (30 g), polytetrahydrofuran diol (40 g, molecular weight of 1000), and photo-initiator 1173 (2 g) were mixed uniformly at room temperature, and then the mixture was poured into a stainless steel mould of 20 mm length, 20 mm width, and 0.6 mm depth, the mould was treated with a silane releasing agent first, and the mixture was levelled, and then the surface was covered with a transparent polyester film when there was no air bubble, and finally, it was irradiated using a high pressure mercury lamp with a power of 120 w/cm for 15-30 sec, and then Sample G was obtained by taking the film out. At a temperature from room temperature to about 50° C., Sample G has a colorless and transparent appearance, and has an optical transmittance of more than 75%; and at 80° C., the appearance becomes white, and the optical transmittance is less than 6%. The thermo-optic effect shown by Sample G can be repeated.

Example 11

The present example prepared a thermosensitive light-adjusting film by photo-curing.

Monomer 1 (20 g), PUA 1 (20 g), TDiol 1000 (20 g), and photo-initiator 1173 (0.3 g) were mixed uniformly at room temperature, and then the mixture was poured into a stainless steel mould of 20 mm length, 20 mm width, and 0.6 mm depth, the mould was treated with a silane releasing agent first, and then the surface was covered with a transparent polyester film, and finally, it was irradiated using a high pressure mercury lamp with a power of 120 w/cm for 15-30 sec, and then Sample H was obtained by taking the film out. At a temperature from room temperature to about 40° C., Sample H has a colorless and transparent appearance, and has an optical transmittance of more than 75%; and at 70° C., the appearance becomes white, and the optical transmittance is less than 6%. The thermo-optic effect shown by Sample H can be repeated.

Example 12

The present example prepared a thermosensitive light-adjusting film by photo-curing.

Monomer 1 (30 g), PUA 2 (10 g), TDiol 1000 (20 g), and photo-initiator 1173 (2 g) were mixed uniformly at a room temperature, and then the mixture was poured into a stainless steel mould of 20 mm length, 20 mm width, and 1 mm depth, the mould was treated with a silane releasing agent first, and then the surface was covered with a transparent polyester film, and finally, it was irradiated using a high pressure mercury lamp with a power of 120 w/cm for 15-30 sec, and then Sample I was obtained by taking the film out. At a temperature from room temperature to about 65° C., Sample I has a colorless and transparent appearance, and has an optical transmittance of more than 75%; and at 100° C., the appearance becomes white, and the optical transmittance is less than 6%. The thermo-optic effect shown by Sample I can be repeated.

Example 13

The example prepared a light cured thermo-sensitive film using a coating method.

Figure 2:
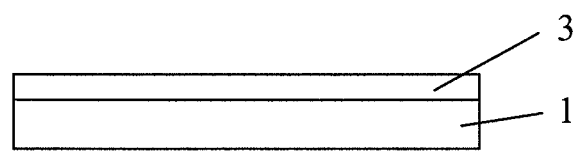
FIG. 2 is a cross-section schematic view showing the configuration of another optical device.

Monomer 2 (65 g), TDiol 1000 polyether (16 g), and photo-initiator 1173 (4 g) were mixed uniformly at room temperature, and then the mixture was coated onto a poly(tetrafluoro ethylene) plate of 100 mm length, and 50 mm width, the thickness of the coating was 0.8 mm, and finally, the plate coated was irradiated using a high pressure mercury lamp with a power of 120 w/cm for 30 sec. FIG. 2 shows the cross-section structure of the obtained device, in which 1 represents poly(tetrafluoro ethylene) plate as a substrate, 3 represents an optical film material coated in the present example. At a temperature from room temperature to about 80° C., the film material 3 on the device has a colorless and transparent appearance, and has an optical transmittance of more than 80%; and at 110° C., the appearance of the film material 3 on the device becomes white, and the optical transmittance is less than 5%. The thermo-optic effect shown by the film material 3 on the device can be repeated.

The above mentioned films samples have very high optical transmittances at room temperature, but the films samples have very low optical transmittances at a higher temperature, and then the cloudy films samples will become transparent after they are placed at room temperature for a period of time. Therefore, The above mentioned films samples show a reversible thermo-cloud characteristics.

What we claim:

1. A thermo-sensitive light-adjusting material, wherein, the thermo-sensitive light-adjusting material is produced by photo- or thermo-polymerizing a polymer polyol and/or a hydroxyl-terminated polymer prepared by reacting a polymer polyol and diisocyanate in the amount of 18-84% by weight, and a hydroxyl-containing carbon-carbon unsaturated monomer in the amount of 15-80% by weight.

2. The thermo-sensitive light-adjusting material according to claim 1, wherein, the polymer polyol is at least one of polyether polyols, aliphatic polyester polyols, and hydroxyl-terminated polymers prepared by reacting a polymer polyol and a diisocyanate, wherein the molecular weight of the polymer polyol is about 600-4000 g/mol, and the molecular weight of the hydroxyl-terminated polymer is about 6000-20000 g/mol.

3. The thermo-sensitive light-adjusting material according to claim 2, wherein, the polyether polyols are selected from polyethylene oxide polyols, polypropylene oxide polyols, poly-tetrahydrofuran polyols, and polystyrene oxide polyols; and the aliphatic polyester polyols are selected from polyester polyols prepared by reacting dicarboxylic acids and diols with 4-8 carbon atoms, and polyester polyols prepared by reacting a hydroxyl aliphatic acid having 4-8 carbon atoms.

4. The thermo-sensitive light-adjusting material according to claim 1, wherein, the hydroxyl-containing carbon-carbon unsaturated monomer is at least one of compounds with 6-30 carbon atoms, 2-6 oxygen atoms, and ester group, hydroxyl group, and aromatic ring, and the molecular weight of the monomer is 130-500 g/mol, and the refractive index of the monomer is 1.48 or more.

5. An optical device, comprising a thermo-sensitive light-adjusting material, wherein the thermo-sensitive light-adjusting material is produced by photo- or thermo-polymerizing a polymer polyol and/or a hydroxyl-terminated polymer prepared by reacting a polymer polyol and diisocyanate in the amount of 18-84% by weight, and a hydroxyl-containing carbon-carbon unsaturated monomer in the amount of 15-80% by weight.

6. The optical device according to claim 5, wherein, the device comprises a substrate (1), a covering layer (2), and a sheet or a film (3) placed therebetween and produced by the thermosensitive light-adjusting material, or comprises a substrate (1), and film (3) coated thereon and produced by the thermosensitive light-adjusting material.

7. The optical device according to claim 5, wherein, the substrate (1) is any of plastic film, plastic plate, fiber glass sheet, steel belt, metal plate, flat glass, organic glass, conductive glass; and the covering layer (2) is a transparent coating, a plastic film or sheet.

* * * * *